(12) United States Patent
Mroczka (10) Patent No.: US 8,789,730 B2
(45) Date of Patent: Jul. 29, 2014

(54) BACKPACK WITH COLLAPSIBLE STRETCHER AND COLLAPSIBLE WHEEL ASSEMBLY

(76) Inventor: David E. Mroczka, Babylon, NY (US)

( * ) Notice: Subject to any disclaimer, the term of this patent is extended or adjusted under 35 U.S.C. 154(b) by 938 days.

(21) Appl. No.: 12/287,970

(22) Filed: Oct. 14, 2008

(65) Prior Publication Data

US 2010/0237111 A1 Sep. 23, 2010

Related U.S. Application Data

(60) Provisional application No. 60/999,249, filed on Oct. 16, 2007.

(51) Int. Cl.
*A45F 3/08* (2006.01)
*A61G 1/013* (2006.01)
*A61G 1/06* (2006.01)

(52) U.S. Cl.
USPC ............ 224/156; 224/158; 224/160; 224/184

(58) Field of Classification Search
USPC .......................... 224/158, 160, 184, 576, 153; 5/625–627
See application file for complete search history.

(56) References Cited

U.S. PATENT DOCUMENTS

| | | | | |
|---|---|---|---|---|
| 2,316,456 A | * | 4/1943 | Robes, Jr. | 224/156 |
| 2,362,721 A | * | 11/1944 | Reynolds | 5/626 |
| 2,918,296 A | * | 12/1959 | Goodale | 280/645 |
| 3,448,779 A | * | 6/1969 | Horwitt | 141/38 |
| 3,620,428 A | * | 11/1971 | Silverthorne | 224/156 |
| 3,834,433 A | * | 9/1974 | Thompson | 141/392 |
| 3,846,855 A | * | 11/1974 | Peterson | 5/114 |
| 3,886,609 A | * | 6/1975 | MacKenzie | 5/110 |
| 3,921,231 A | * | 11/1975 | Bourgraf et al. | 5/627 |
| 4,060,079 A | * | 11/1977 | Reinhold, Jr. | 601/106 |
| 4,154,279 A | * | 5/1979 | Tsuruta | 152/416 |
| 4,234,005 A | * | 11/1980 | Taylor, III | 135/95 |
| 4,286,739 A | * | 9/1981 | Silcott et al. | 224/156 |
| 4,286,740 A | * | 9/1981 | Knight | 224/157 |
| 4,431,121 A | * | 2/1984 | Bensette | 224/153 |
| 4,511,071 A | * | 4/1985 | Curran | 224/156 |
| 4,836,938 A | * | 6/1989 | Kobasic | 224/155 |
| 4,885,812 A | * | 12/1989 | Lindner | 5/113 |
| 4,955,517 A | * | 9/1990 | Maresca | 224/155 |
| 4,969,493 A | * | 11/1990 | Lee | 141/38 |
| 5,050,254 A | * | 9/1991 | Murphy | 5/625 |
| 5,375,277 A | * | 12/1994 | Carr et al. | 5/625 |
| 5,496,092 A | * | 3/1996 | Williams et al. | 297/250.1 |
| 5,590,825 A | * | 1/1997 | Murdock | 224/156 |
| 5,787,529 A | * | 8/1998 | Landes | 5/628 |
| 5,820,141 A | * | 10/1998 | Wilkerson et al. | 280/30 |
| 5,887,879 A | * | 3/1999 | Chumley | 280/40 |
| 6,145,559 A | * | 11/2000 | Ingram, II | 152/417 |
| 6,217,043 B1 | * | 4/2001 | Chumley | 280/40 |
| 6,283,496 B1 | * | 9/2001 | Dickmann | 280/652 |

(Continued)

*Primary Examiner* — Hemant M Desai
*Assistant Examiner* — Gloria R Weeks
(74) *Attorney, Agent, or Firm* — Alix, Yale & Ristas, LLP (57) ABSTRACT

A backpack employs a collapsible stretcher and a collapsible wheel assembly. The backpack may be transformed from a compact mode suitable for portability of the backpack to an extended mode wherein the stretcher is extended. A pair of wheels are inflated so that the wheels at one end contact the terrain and at the other end the stretcher is engaged to the backpack to provide for an efficient transport of an injured individual placed in the stretcher.

7 Claims, 10 Drawing Sheets

(56) References Cited

U.S. PATENT DOCUMENTS

| | | | |
|---|---|---|---|
| 6,375,200 B1 * | 4/2002 | Harter | 280/30 |
| 6,413,194 B1 * | 7/2002 | Gant | 482/112 |
| 6,561,529 B2 * | 5/2003 | Darling, III | 280/79.2 |
| 6,575,483 B1 * | 6/2003 | Davis | 280/63 |
| 6,585,019 B1 * | 7/2003 | Ingram | 152/417 |
| 6,585,285 B2 * | 7/2003 | Koch | 280/656 |
| 6,722,812 B1 * | 4/2004 | Carletti et al. | 403/385 |
| 6,763,617 B1 * | 7/2004 | Stafford | 36/122 |
| 6,805,269 B2 * | 10/2004 | Lockard | 224/153 |
| 6,968,882 B2 * | 11/2005 | Ingram | 152/417 |
| 7,150,465 B2 * | 12/2006 | Darling, III | 280/640 |
| 7,302,723 B2 * | 12/2007 | Dean | 5/627 |
| 7,607,184 B1 * | 10/2009 | Goodner, Jr. | 5/627 |
| 7,775,530 B2 * | 8/2010 | Darling, III | 280/47.18 |
| 7,818,840 B2 * | 10/2010 | Barnett et al. | 5/627 |
| 7,896,045 B2 * | 3/2011 | Solie et al. | 152/417 |
| 8,087,112 B2 * | 1/2012 | Cahaan | 5/625 |
| 8,113,396 B2 * | 2/2012 | Schilly | 224/155 |
| 2004/0108688 A1 * | 6/2004 | Holmes | 280/640 |
| 2004/0183264 A1 * | 9/2004 | Agee et al. | 280/47.3 |
| 2007/0216118 A1 * | 9/2007 | Jackson et al. | 280/47.131 |

* cited by examiner

BACKPACK WITH COLLAPSIBLE STRETCHER AND COLLAPSIBLE WHEEL ASSEMBLY

CROSS-REFERENCE TO RELATED APPLICATION

This application claims the priority of U.S. Provisional Patent Application No. 60/999,249 filed Oct. 16, 2007.

BACKGROUND OF THE TECHNOLOGY

The technology relates generally to backpacks such as may be employed by hikers, search and rescue workers and soldiers, and to stretchers such as may be employed for rescue by military personnel, hikers and rescuers in remote locations. In addition, the technology relates to a collapsible wheel assembly such as may be employed in strollers, gurneys and game carriers used by hunters.

SUMMARY

Briefly stated, a backpack comprises a main frame and a strap assembly connecting the main frame. A collapsible stretcher is mounted to the frame and is transformable from a compact storage mode for portability with the main frame to an extended mode for usage of the stretcher for transportation purposes. In the extended mode, the stretcher may be supported at a proximal end by the main frame and is adapted to carry an individual with a distal end assembly engaging the terrain. The stretcher comprises a pair of telescopic rails. A flexible carrier connects the rails. A crossbar connects at one end of each rail pair. An axle assembly connects a second end of each rail pair and is extendable to provide a pair of wheels which are transversely spaced from the rails. In the extended mode, the crossbar is hingeably connected to the main frame, and the rails and axle assembly are extended so the wheels are engaged with the terrain to permit efficient transport of a person placed on the stretcher by a single individual to whom the main frame is mounted.

In the compact mode, the stretcher is configured in a collapsed stretcher frame and is attached to the main frame. The proximal end of the stretcher is hingeably connected to the main frame at a first location. The rails are retracted and are secured to the main frame at a second location. A spring urges the rails to pivot away from the main frame. The rails are secured by a releasable connector to the top of the main frame, and the connector is releasable so that the rails pivot under the bias of the spring. When the rails pivot, an extension of the axial assembly is projected transversely, and the rails are slidably extended to an extended mode.

The axle assembly comprises a spring loaded extension axle and a toroidal bladder which is rotatably mounted to the extension axle. The stretcher is transformed to the extended mode wherein the extension axle is automatically transversely projected and the wheel is automatically inflated. A gas cylinder has a valve which is opened to inflate the wheel. There is a spring loaded extension axle for each wheel. A carbon dioxide cartridge with a valve preferably inflates each of the wheels.

A carrier assembly comprises a pair of support members and an axle assembly which is mounted to an end of the members. The axle assembly comprises a tube and a spring loaded extension axle is received in the tube. The axle extension mounts a journal bearing which mounts a bladder. A gas cartridge has a valve which is in fluid communication with the bladder. When the valve is opened, the bladder is inflated to form a wheel rotatable about the extension axle. The extension axle is projected transversely and the bladder is also projected transversely from the tube and the valve is automatically opened to inflate the bladder. A second spring loaded extension axle is received in the tube at an axially opposite location. The second extension axle also mounts a second journal bearing which mounts a second bladder and a second gas cartridge having a valve in fluid communication with the second bladder. When the second valve is opened, the bladder is inflated to form a second wheel rotatable about the second extension axle. A flexible carrier may connect between the support members. The gas cartridge preferably contains pressurized carbon dioxide.

DETAILED DESCRIPTION

Figure 2A:
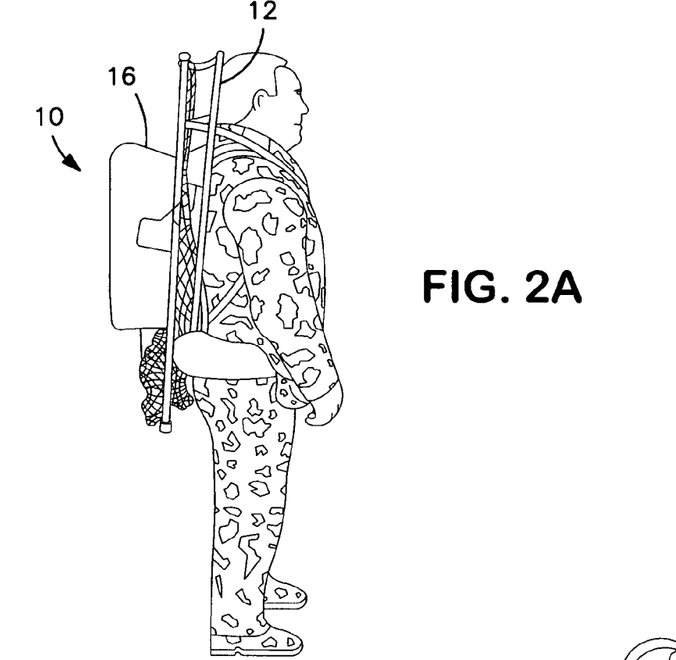
FIGS. 2A, 2B, 2C and 2D are photographs illustrating how the backpack may be deployed from a compact storage condition to an extended configuration for transporting an individual.
Figure 2B:
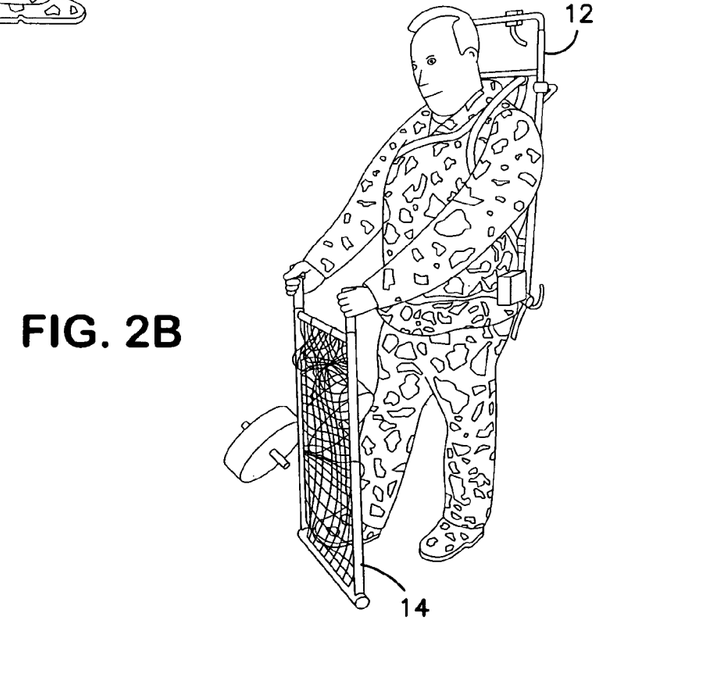
Figure 2C:
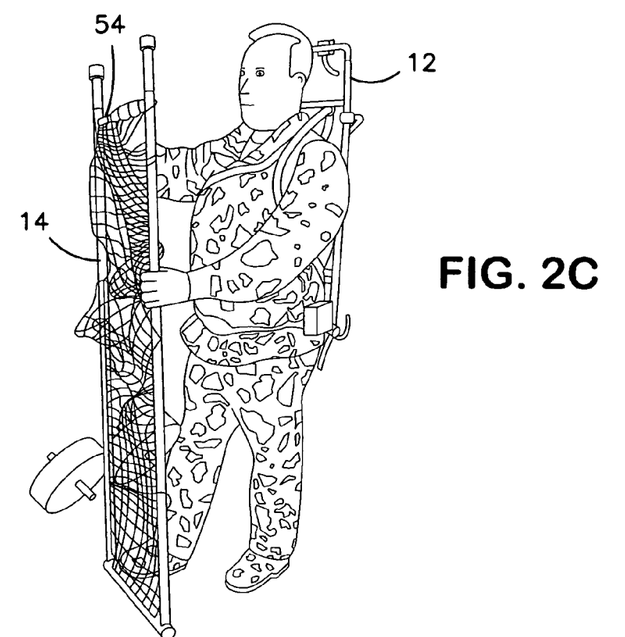

With reference to the drawings wherein like numerals represent like components throughout the figures, a backpack 10 with straps 11 comprises three main sub assemblies: a pack frame 12, a collapsible stretcher 14 and a pack 16. In the normal backpack storage mode, the pack frame 12, the stretcher 14 and the pack 16 are integrated and secured to form a backpack 10 which has an outward compact configuration similar to any other backpack or military rucksack except for the modifications described herein. As illustrated in FIG. 2A, the backpack 10 can thus be employed and transported by a hiker, a search and rescue worker or soldier or other similar personnel in the same fashion as a backpack may be employed for non-rescue use.

The pack frame 12 preferably includes upper and lower cross members 13 and 15, respectively, and transversely spaced side supports 17 and 19.

In the compact mode, the stretcher 12 forms a collapsed stretcher frame designated by the numeral 22. The stretcher 12 comprises two main telescopic rails 50 and 52, a crossbar 54, which may be telescopic, and a telescopic or hinged axle assembly designated generally by the numeral 60. One end of the rails 50 and 52 connects with the crossbar 54 and the opposite end connects with the axle assembly 60. A flexible carrier 56, which may have a mesh fabric and other suitable construction, connects with rails 50 and 52. The axle assembly 60 is employed first either by telescopic or hinged sections 62 and 64 that are received in an axle tube 70, thus creating an envelope space for bladders 78 which ultimately transforms to high flotation self-inflating wheels 80.

The stretcher frame 22 is positioned against the pack frame 12 so that the axle assembly 60 is generally adjacent frame member 13, crossbar 54 is adjacent and pivotally connected to frame member 15, and rails 50 and 52 are adjacent supports 17 and 19, respectively. The 22 frame is covered by the pack 16. The upper portion of the frame 22 is secured to the pack frame 12 by lanyards 20 or other releasable connectors.

Figure 1:
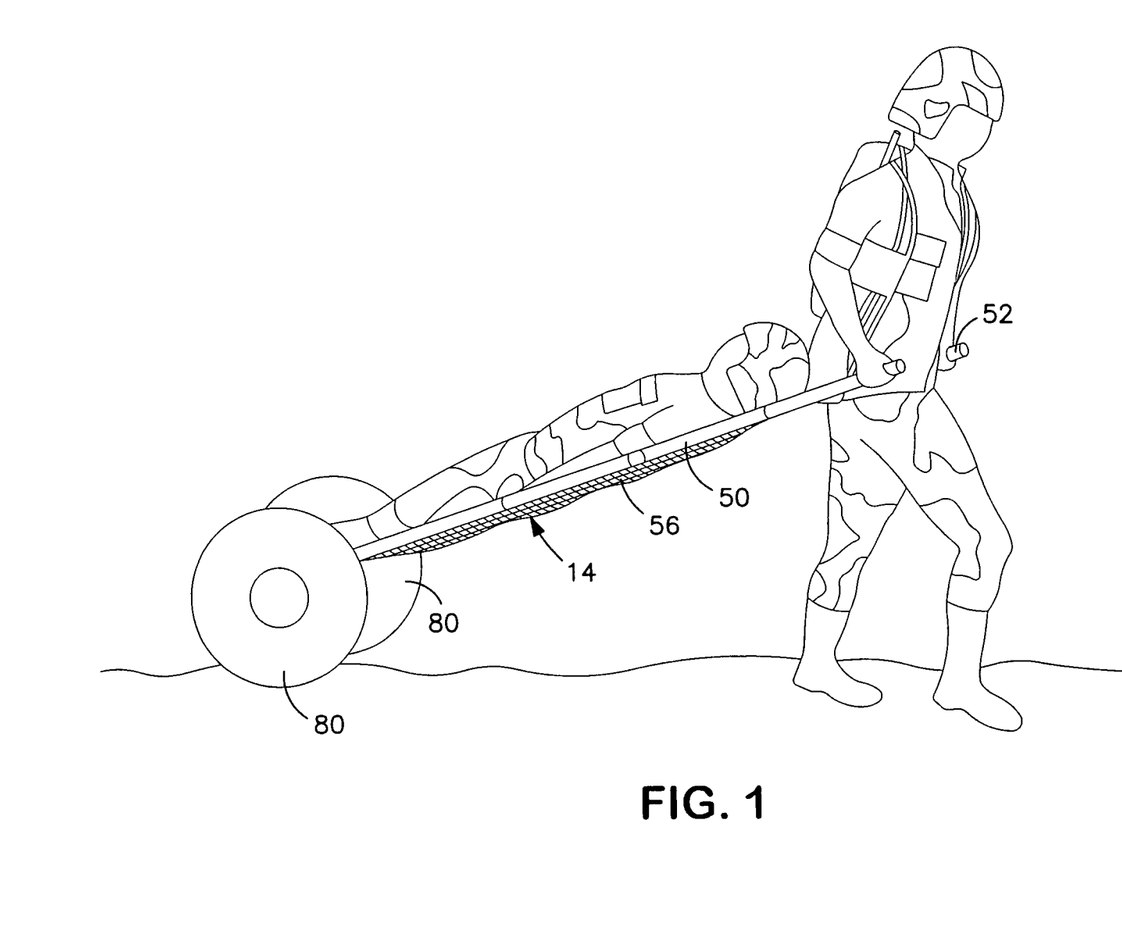
FIG. 1 is a representational view illustrating a backpack, a stretcher and a wheel assembly as used to transport an injured person.

When usage of the stretcher 14 is required, the stretcher frame 22 is withdrawn from the pack 16 and frame 12, and the stretcher is transversely suspended from lower member 15 and expanded to an extended mode for usage (FIGS. 1; 2D). The stretcher may be partially supported by the frame for transporting an injured person (See FIG. 2D). Upon termination of usage, the stretcher may be collapsed and returned with the pack to the compact storage mode (FIG. 2A).

When the stretcher 14 is required, the wearer of the backpack pulls on two lanyards (ripcords 20), thus releasing a top portion of the collapsible stretcher 14 from the pack frame 12. With reference to FIGS. 3A to 3D, the collapsed stretcher frame 22, which is now approximately the same length as the pack frame 12, tilts away from the pack frame due to a spring 28 biased to rotate in a pivotal motion about the crossbar 54/crossmember 15 hinge connection at the lower portion of the pack frame 12. The stretcher frame 22 remains connected to the pack frame via two large hooks 30 and 32 at the base of the pack frame. The hooks also provide a hinge function as the stretcher frame falls and pivots away from the pack frame.

Figure 4A:
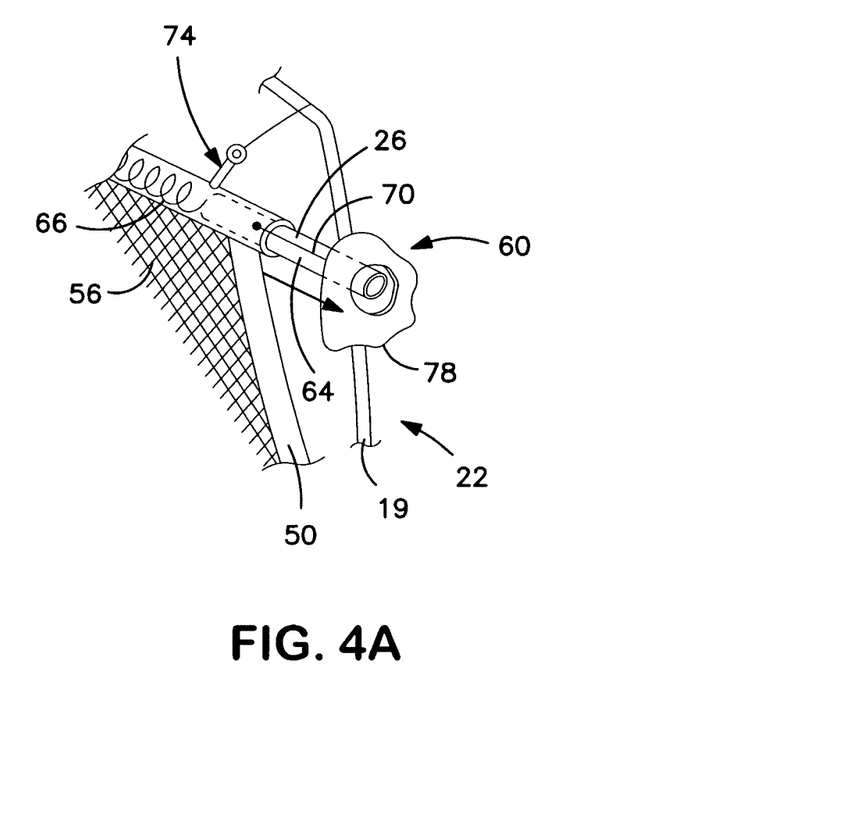
FIGS. 4A and 4B are enlarged fragmentary views, partly in section and partly in phantom, illustrating the activation of the collapsible wheel assembly.
Figure 4B:
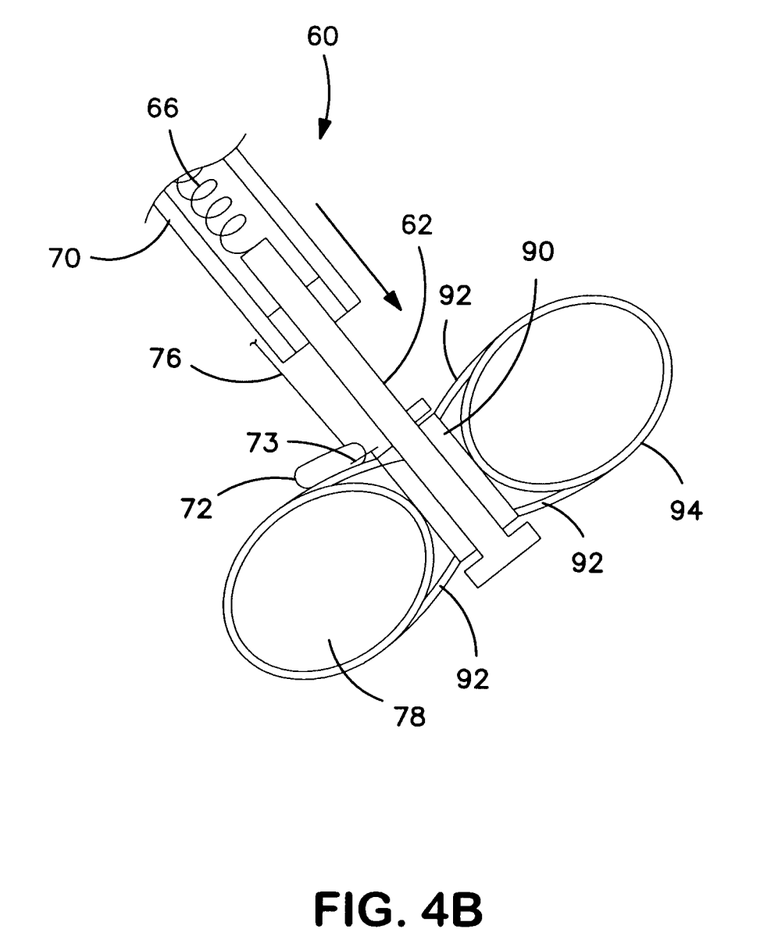
Figure 4C:
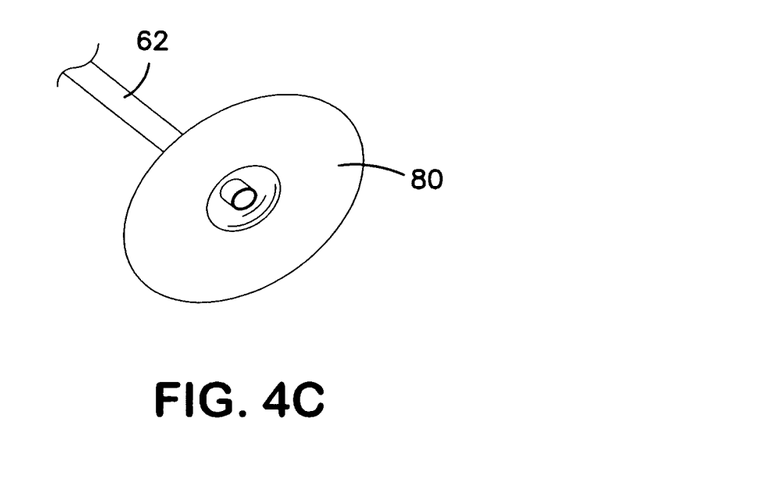
FIG. 4C is an enlarged fragmentary perspective view of a portion of the wheel assembly upon inflation.

As the stretcher frame 22 separates from the pack frame 12, multiple tethers 26 permanently fixed to the back pack frame are placed in tension and cause pins 74 to be pulled from the axle assembly 60 of the stretcher frame (FIG. 4A). The removal of the tether pins 26 from the axle tube 70 allow axles 62 and 64 to spring out under the urging of a coil spring 66 (FIG. 4B) and provide a wide stable wheel base (FIG. 2D) for the stretcher. As the axle assembly 60 extends transversely, it triggers carbon dioxide ($CO_2$) cartridges 72 associated with bladder or to provide pressure required for wheel inflation.

Figure 5A:
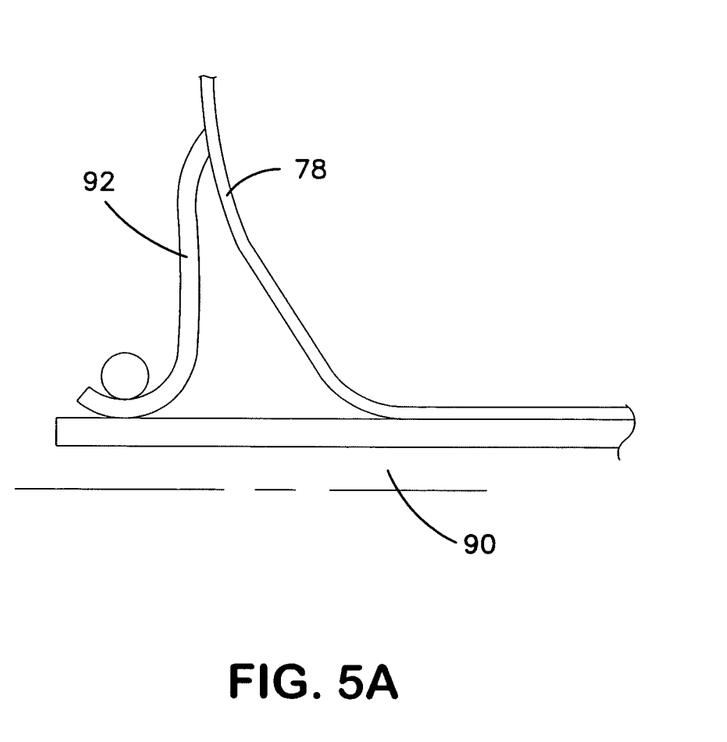
FIG. 5 is an enlarged sectional view, illustrating the structure of a collapsible wheel.
Figure 5B:
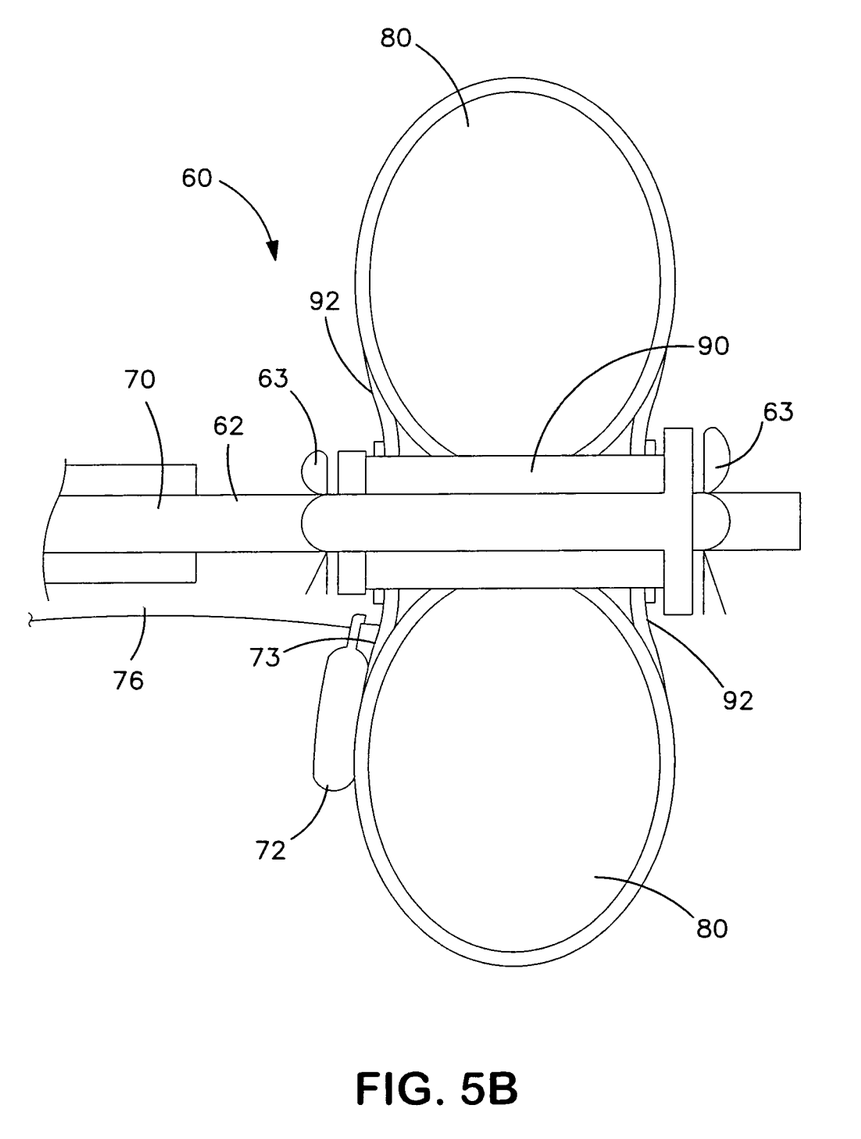

The travel of this outward extension can be a telescoping action and/or a pivotal movement about a hinge (not illustrated). The outward movement of the axles 62 and 64 also concurrently trigger the opening of valves 73 of the compressed carbon dioxide ($CO_2$) cartridges 72, thus inflating the collapsed bladders 78 to form inflated wheels on either side of the axle FIGS. 5 and 6). The wheel is secured to the axles 62 or 64 by cotter pins 63 or other suitable means. Within seconds the wheel side of the stretcher has fallen to the ground behind the user and two high flotation wheels 80 have been deployed and inflated.

The wheels have a relatively low diameter-to-width ratio which results in a quasi-bulbous shape. In one embodiment, the width of the wheel is approximately 9 inches and the diameter is approximately 12 inches. For one preferred range, the diameter/width ratio varies from 0.70 to 2.50. For the FIG. 6 embodiment, the ratio of the diameter to the width of wheels 80 is approximately 2.00.

Each wheel 80 is constructed by attaching the toroidal bladder 78 to a low profile, high aspect ratio journal bearing 90. The inner diameter of the journal bearing then receives an axle shaft of the extension axle 62 or 64 to allow relative rotational movement/motion between the two components. The toroidal bladder 78 is attached to the journal bearing 90 which essentially has no rim structure or any radical structure. The radial flaps 92 extend downward from the sidewall of the toroidal bladder 78 to the outside diameter of the journal bearing. These flaps 92 are then clamped to the journal bearing tightly to prevent slippage axially outwardly.

Alternatively, the exterior surfaces of the toroidal bladder 78 may be covered with a fabric or other flexible cover 94 (FIG. 4B) that will enhance abrasion and puncture resistance. The cover 94 provides the anchoring between the bladder 78 and the journal 90. The cover 94 may be manufactured from fabric or other materials which will protect the bladder from puncture or other damage. The inflated wheel again has no rim, no spokes and no fixed rigid radial support structure.

Figure 6:
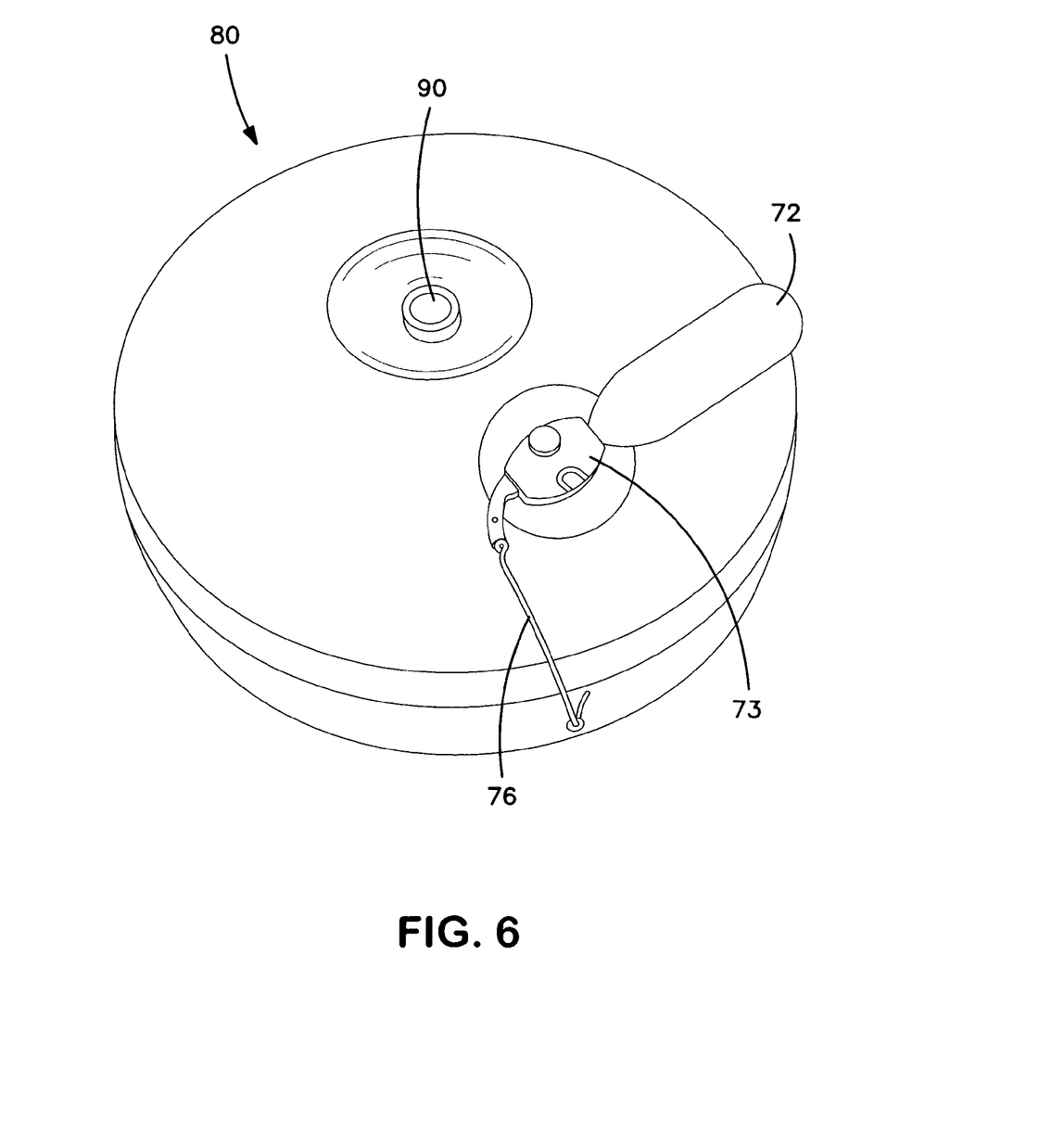
FIG. 6 is an enlarged perspective view of an inflated collapsible wheel and an inflation assembly.

Force transfer via tether line 76 or rip cord, either by hand or by actuation by some sort of primary application, such as the movement of the extension axle relative to the axle tube 70, causes a valve 73 to open and high pressure gauge gas, such as compressed carbon dioxide ($CO_2$), to escape from a small pressure vessel and enter the toroidal bladder 78 of the wheel. The toroidal bladder inflates to a designated pressure (FIG. 6). The designated pressure can be achieved in one of two ways: first, by calculation of the pressure and the volume of a small pressure vessel as compared to the high volume and lower pressure of the toroidal bladder, or second, by regulating the pressure via a regulator pressure release valve. After the designated pressure is reached, the wheel 80 is ready for use.

The $CO_2$ gas may be substituted with other gases or a thermaset forming material that will harden to a round shape inside of the toroidal bladder but allows the wheel to work with no rigid structural supporting members. The low aspect ratio results from the wheel being very wide and having a high width-to-diameter ratio (or low diameter-to-width ratio) compared to many of the related typical wheels. This allows for a high load carrying capability without requiring structural support of the sidewall, i.e. the wheels are resistant to buckling under heavy loads.

Figure 2D:
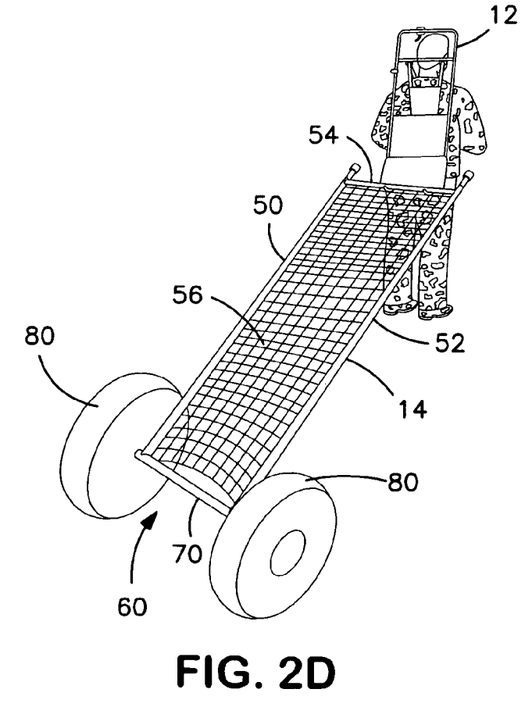
Figure 3A:
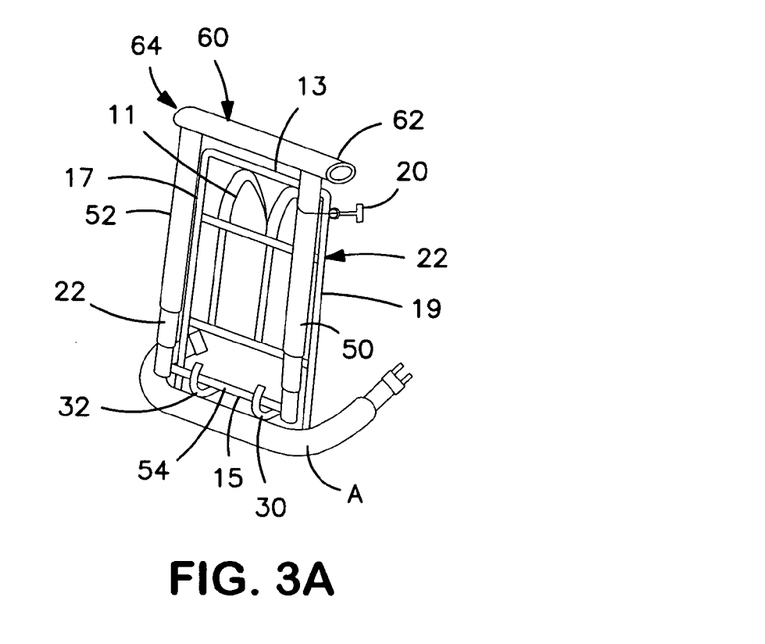
FIGS. 3A, 3B, 3C and 3D are fragmentary views, partly in diagram form, illustrating the mechanical structures for withdrawing the stretcher from the pack.
Figure 3B:
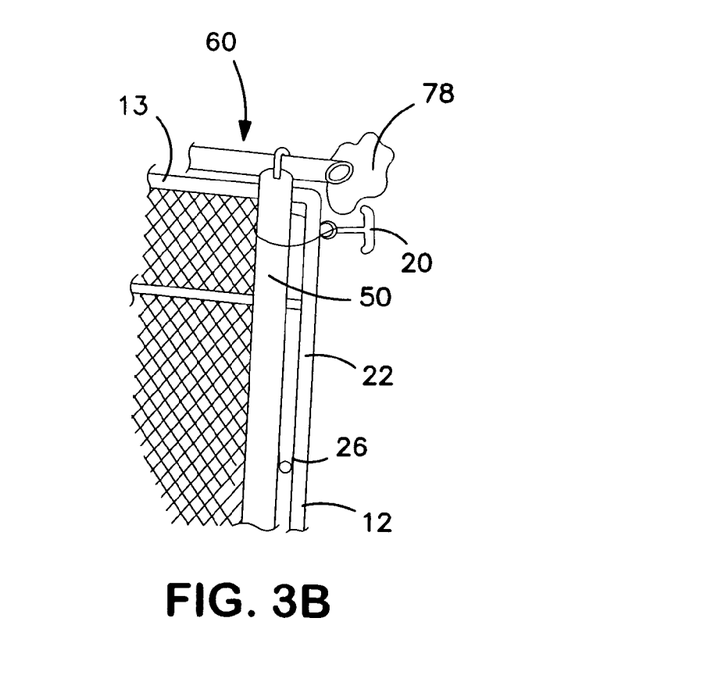
Figure 3C:
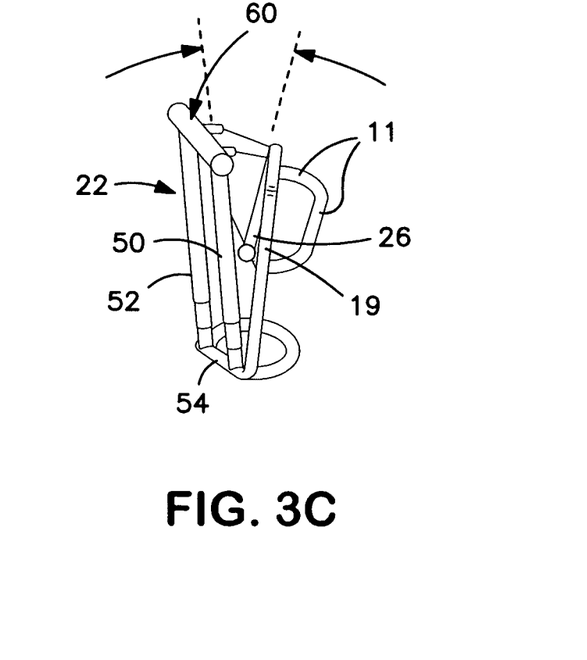
Figure 3D:
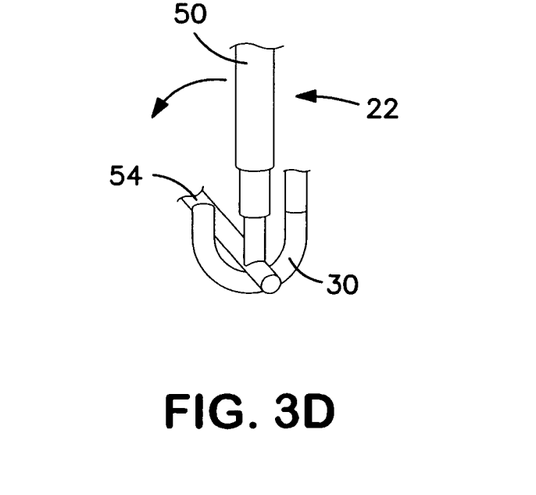

The backpack 10 has straps 11 and provides all the normal functions of a typical external frame backpack while having the additional ability to rapidly deploy a rescue stretcher after activating the deployment lanyards 20 attached to the release and deployment mechanisms. This combination assembly is ideal for hikers, search and rescue workers and soldiers since they can transport either normal military or hiking items in the backpack for normal non-rescue use. When an injury or other event occurs that requires transport, the rescue stretcher 14 can be deployed in under 20 seconds for a rapid evacuation. Further, the stretcher can be operated by a single person for rescue of a partner when only two people are present in a given remote location. The stretcher 14 can also be operated in a hands free mode to allow an injured hiker to use his hands for traversing rough terrain or to allow a soldier to carry and fire a weapon while in the middle of a rescue situation (FIG. 2D).

The pair of collapsible wheels 80, at least in the given environment, is inherently more efficient than related collapsible wheel designs. A primary application of the collapsible wheel feature is in conjunction with the collapsible stretcher 14 as described. However, the collapsible wheel features may have a wide range of applications apart from the described collapsible stretcher. Because in the inflated state the wheel has a wide profile and high flotation characteristics, it can easily traverse muddy, wet, snowy or sandy terrain. In addition, the wheel can be deployed in a matter of seconds and does not require any special tools. It can also be automatically deployed and incorporated into various other applications.

The substantial hands free features provide improved capabilities since the load from the stretcher is now distributed to the pack frame which provides better and more comfortable load carrying capability. In the expanded state, the stretcher 14 can be integrated with the pack frame 12. In addition, the inflatable wheels can also be deployed in a highly efficient fashion to provide a versatile structure. The deployed assembly provides very wide and high width to diameter ratios for the wheels which allow for high load carrying capability without requiring structural support for the sidewall.

After usage the stretcher, including the wheel assembly, may be efficiently collapsed and reattached to the frame for subsequent usage as previously described. The wheels 80 are collapsed by opening the valve 73 to the atmosphere or by applying a vacuum to the bladder interior.

While preferred embodiments have been set forth for descriptive purposes, the foregoing description should not be deemed a limitation of the invention herein. Accordingly, various modifications, adaptations and alternatives may occur to one skilled in the art without departing from the spirit and scope of the invention.

What is claimed:

1. A backpack comprising:
   a main frame and an associated strap assembly to mount said main frame to a back of a transporter;
   a collapsible stretcher mounted to said frame and transformable while said main frame is mounted to the back of said transporter from a compact mode for portability with said main frame to an extended mode supported at a proximal end by the main frame and adapted to carry an individual with a distal end engaging the terrain, said stretcher comprising:
   a pair of telescoping rails;
   a flexible carrier connecting said rails;
   a crossbar connecting at one end of each rail pair;
   an axle assembly disposed at a second end of each rail pair and extendable to provide a pair of wheels which are transversely spaced from said rails;
   wherein in a compact mode said proximal end of said collapsible stretcher is hingeably connected to said main frame at a first location and said rails are retracted and are secured to said main frame at a second location, in the extended mode said crossbar is hingeably connected to said main frame, and said rails and axle assembly are extended so that said wheels are engaged with the terrain to permit transport of said individual placed on said stretcher while the main frame is mounted via the strap assembly to the back of said transporter.

2. The backpack of claim 1 further comprising a spring which urges said rails to pivot angularly away from said main frame.

3. The backpack of claim 2 wherein said rails are secured by a connector to said main frame and said connector is releasable so that said rails pivot under the bias of said spring.

4. The backpack of claim 3 wherein when said rails pivot, an extension of said axle assembly is projected transversely and said rails are urged to said extended mode.

5. The backpack of claim 1 wherein said axle assembly comprises a spring loaded extension axle and a toroidal bladder rotatably mounted to said extension axle, and wherein when said stretcher is transformed to the extended mode, the spring loaded extension axle is automatically projected in a direction coaxial with said extension axle, and transverse to a path of travel of the stretcher, and said wheel is automatically inflated.

6. The backpack of claim 5 wherein a gas cylinder has a valve which is opened to inflate the wheel.

7. The backpack of claim 6 further comprising a spring loaded extension axle for each said wheel and a carbon dioxide cartridge with a valve which inflates a second wheel.

* * * * *